(12) United States Patent
Ossian

(10) Patent No.: US 7,276,178 B1
(45) Date of Patent: Oct. 2, 2007

(54) PAN AGGLOMERATED DEICER COMPOSITION USING ANHYDROUS RAW MATERIALS

(75) Inventor: Kenneth C. Ossian, Davenport, IA (US)

(73) Assignee: Ossian, Inc., Davenport, IA (US)

( * ) Notice: Subject to any disclaimer, the term of this patent is extended or adjusted under 35 U.S.C. 154(b) by 29 days.

(21) Appl. No.: 11/399,140

(22) Filed: Apr. 6, 2006

(51) Int. Cl.
*C09K 3/18* (2006.01)

(52) U.S. Cl. .......................... 252/70; 106/13; 23/313 P; 264/117

(58) Field of Classification Search .................. 252/70; 106/13; 23/313 P; 264/117
See application file for complete search history.

(56) References Cited

U.S. PATENT DOCUMENTS

| | | | |
|---|---|---|---|
| 5,211,869 A | 5/1993 | Steinhauser et al. | |
| 6,039,890 A | 3/2000 | Ossian et al. | |
| 6,149,834 A | 11/2000 | Gall et al. | |
| 6,821,453 B2 * | 11/2004 | Chon et al. | ............ 252/70 |

* cited by examiner

*Primary Examiner*—Anthony J. Green
(74) *Attorney, Agent, or Firm*—McKee, Voorhees & Sease, P.L.C.

(57) ABSTRACT

A method of forming a pan agglomerated deicer composition which avoids the need for a separate drying step. An agglomeration is accomplished by mixing at least partially anhydrous and halide salts of metals, grinding those into a fine powder, and pan agglomerating the fine powder with water or solutions of the halide salts which upon contact with the dry fine powder form fully hydrated and stable pan agglomerated salt mixtures which do not require drying.

17 Claims, No Drawings

PAN AGGLOMERATED DEICER COMPOSITION USING ANHYDROUS RAW MATERIALS

FIELD OF THE INVENTION

This invention relates to deicer compositions, and in particular an efficient method of forming pan agglomerated deicing compositions without the use of expensive drying processes.

BACKGROUND OF THE INVENTION

This invention relates to an improvement in commonly owned previous U.S. Pat. No. 5,211,869 issued May 18, 1993. This issued patent describes a mixture of calcium halide salts, ground to a fine powder, then combined into a pellet form on a pan agglomerater using as the preferred agglomerating solution, a magnesium chloride solution. The finished product was then dried. The drying process itself was difficult and expensive, making that pan agglomerated product difficult to competitively price with other competing products.

While pan agglomeration achieves significant advantages in terms of product performance of those agglomerates, those advantages are insufficient to justify the large price differential caused by the expensive drying process. It can therefore be seen that it would be desirable to have a pan agglomeration process achieving the advantages of the agglomerates resulting from pan agglomeration, i.e., substantially spherical, highly porous, low bulk density fast ice melters, but doing so without the added economics of a separate and distinct heating step. Achieving such is a primary objective of this invention.

Much effort has gone towards achieving the above primary objective of the present invention, and it involved many trial and error steps. Those steps involved exploring changes in concentrations and content of the agglomerating solution, changes in ground fine powder content from which the agglomerates are made, changes in a source of the material used, and finally, experimentation with fully hydrated, partially hydrated, dehydrated or anhydrous salts. Anhydrous salts refer to those in which the water of hydration is completely driven off. Partially hydrated salts refer to those in which only a portion of the water of hydration is driven off. Fully hydrated refers to the salts having maximum number of water of hydration molecules associated with the salt. For example calcium chloride may exist in an anhydrous form, a monohydrate, a dihydrate or a hexahydrate. Anhydrous form refers to no molecules of water of hydration and the hexahydrate refers to a fully hydrated calcium chloride.

After exploring all of the above possible alternatives it has been discovered that the key to preparing a successful pan agglomerated product achieving all the normal objectives and advantages of pan agglomeration without having an expensive drying process is to use as the source material for the fine dry powder anhydrous or partially anhydrous halide salts of metals selected from the group consisting of alkali metals and alkaline earth metals. In so doing, the water used in the pan agglomerating fluid hydrates the fine ground powder as agglomeration is occurring making the agglomerates appear physically dry thus avoiding the necessity for a separate heating and drying step.

BRIEF SUMMARY OF THE INVENTION

This invention relates to a pan agglomerated deicer composition and to a process of forming a pan agglomerated deicer composition without the need for a separate and distinct drying step. The process involves forming a mixture partially hydrated or fully anhydrous halide salts, grinding the mixture of halide salts into a fine powder, and thereafter pan agglomerating the powder with an agglomerating fluid that is either water or water solutions of some or all of the halide salts used to form the fine ground powder. The resulting particles are stable during storage, and have all the advantages of pan agglomerated particles i.e. tangible but storage stable, good flowability, bulk density within the range of 30 to 60 pounds per cubic foot, substantial porosity, and fast deicing properties.

DETAILED DESCRIPTION OF THE PREFERRED EMBODIMENT

As was earlier mentioned, the deicer composition of the present invention is formed from a mixture of halide salts of alkali and alkaline earth metals. Preferably the halide salts are chloride salts, and preferably the alkali and alkaline earth metals are sodium chloride, potassium chloride, magnesium chloride and calcium chloride.

The hygroscopic salts of calcium chloride and magnesium chloride are available commercially in the following forms and are stable for storage after packaging. Calcium Chloride dihydrate with a moisture content of approx. 20%; Calcium Chloride monohydrate with a moisture content of approx. 5%; Magnesium Chloride hexahydrate with a moisture content of approx. 50%; Magnesium Chloride Anhydrous with a moisture content of zero.

When any of these earlier listed raw materials are combined with sodium chloride in an agglomeration process they are stable in storage as long as the moisture content does not exceed those listed for the dihydrate form of calcium chloride and hexahydrate form of magnesium chloride.

Agglomerations of calcium chloride and or magnesium chloride added to sodium chloride and or potassium chloride are typically in the following ranges by weight: 20% to 40% calcium chloride and or magnesium chloride are according to my earlier U.S. Pat. No. 5,211,869 which is incorporated herein by reference, combined with 60% to 80% sodium chloride and or potassium chloride. However, quantities over 40% for calcium chloride can be used to eliminate the need for drying, as demonstrated in example four below. The amount of water in the agglomeration solution by weight will range from 5% to 15% with 10% being typical.

The calcium chloride and or magnesium chloride are added to sodium chloride and or potassium chloride and the resulting mixture is ground into a fine powder sized at 60 mesh to 100 mesh. The powder is then added to a pan agglomerator and a agglomeration fluid is sprayed on the powder to form a spherical particle.

The amount of water in the agglomeration will depend on the raw materials being used.

As earlier mentioned the amount of water in the agglomerating solution will range from 5% to 15% by weight with 8% to 12% by weight being typical and therefore preferred. The agglomerating fluid can be water alone, or water solutions of at least some or all of the halide salts.

The pan agglomerating fluid may contain ice melter enhancers. By ice melter enhancers I mean small but property changing effective amounts of materials such as surface active agents, corrosion inhibitors and stabilizers. Amounts of these will vary but generally small amounts of from 0.5% to 1.0%. When surface active agents are employed a broad range of nonionic and ionic, cationic and amphoteric surfactants have been found that are ice melter compatible. That is, they maintain their surface activity at high electrolyte concentrations and are effective at cold temperatures. Many such compounds as suitable ice melt additives are disclosed in my previous U.S. Pat. No. 6,039,890, the disclosure of which is incorporated herein by reference.

Preferably the surface active agent is an nonionic surface active agent which is selected from the group consisting of ethoxylated alkylphenols, ethoxylated non-alkylphenols, and ethylene oxide; a cationic/quaternary surfactant; or an anionic surface active agent consisting of sulfates and the sulfates of oils and fatty acids.

The agglomerating fluid may also contain corrosion inhibitors such as those derived from complex carbohydrates, sugar beet, molasses, etc. Examples of other corrosion inhibitors usable in the present invention may be triethanolamine, Borax, benzotriazol, lignin sulfonate, or sodium glucoheptonate.

Finally, the agglomerating solution may contain other enhancer additives such as stabilizers and even magnesium chloride solution as outlined our previous pan agglomerating patent, U.S. Pat. No. 5,211,869.

The following examples are offered to further illustrate but not limit the invention, and to demonstrate the effectiveness of the product in terms of preparation and economy compared to prior process of pan agglomerating. It goes without saying that changes and modifications may be made and still be encompassed within the scope of the invention and those are deemed important to be included in the scope of the present invention.

EXAMPLES

Example One (Comparative)

Two thousand (2000) lbs of calcium chloride dihydrate contains 400 lbs of water and was added to eight thousand (8000) lbs of sodium chloride The above two ingredients were ground to a fine powder 60 to 100 mesh and conveyed to a pan agglomerator. One thousand (1000) lbs of water as an agglomeration fluid was sprayed onto the mixture.

In this example one, the end product exceeds the amount of moisture that dihydrate calcium chloride is capable of absorbing and would not be stable in storage without drying off 1000 pounds of water that was added by the agglomeration fluid. This is because no anhydrous or partially hydrated product was used.

Example Two (Comparative)

Two thousand (2000) lbs of calcium chloride monohydrate (as opposed to the dihydrate of example 1) contains 100 lbs of water. It was added to eight thousand (8000) lbs of sodium chloride. The above two ingredients were ground to a fine powder, 60 to 100 mesh, and conveyed to a pan agglomerator as shown in U.S. Pat. No. 5,211,869. One thousand (1000) lbs of water as an agglomeration fluid was sprayed onto the mixture.

Example two is not stable in storage without drying off 700 pounds of water from the agglomeration fluid. In example two as illustrated I have converted the calcium chloride to monohydrate rather than dihydrate which reduces the amount of water to be removed, but not enough to avoid the drying process completely.

Example Three

Seven thousand (7000) lbs of calcium chloride monohydrate contains 350 lbs of water. It was added to three thousand (3000) lbs of sodium chloride. The above two ingredients were ground to a fine powder 60 to 100 mesh and conveyed to a pan agglomerator as shown in U.S. Pat. No. 5,211,869.

One thousand (1000) lbs of water as an agglomeration fluid was sprayed onto the mixture.

Example three product is stable in storage. The calcium chloride monohydrate consumes the moisture introduced by the agglomeration fluid and converts it to calcium chloride dihydrate. In this example the 7000 lbs of calcium chloride can take on a maximum of 1,400 lbs of water. This maximum quantity is over the 350 lbs of water introduced with the calcium chloride monohydrate plus the 1000 lbs of water from the agglomeration fluid for a total of 1,350 lbs. Drying is therefore not needed.

Example Four

Two thousand (2000) lbs of magnesium chloride (anhydrous) contains no water. It is added to eight thousand (8000) lbs of sodium chloride. The above two ingredients are ground to a fine powder 60 to 100 mesh and conveyed to a pan agglomerator as shown in U.S. Pat. No. 5,211,869.

One thousand (1000) lbs of water as an agglomeration fluid is sprayed onto the mixture.

Example four product is a stable product in storage and does not require drying as example one and two above. In example four the magnesium chloride anhydrous absorbs one thousand (1000) lbs of water from the agglomeration fluid and convert to magnesium chloride hexahydrate, which is a stable product in storage.

The above examples demonstrate the value of anhydrous calcium chloride and magnesium chloride in the agglomeration process to eliminate the drying process.

Example 5

One particular source of suitable halide salts for the present invention is highly preferred because of availability and effectiveness in use, is byproduct slag resulting from formation of magnesium ingots. Example 5 uses this slag.

Magnesium ingots are formed when raw materials that are heated to a molten stage. The magnesium being the lighter floats to the top and is removed in its molten stage to form magnesium ingots. The resulting molten slag left at the bottom will consist of a combination of calcium chloride, sodium chloride, magnesium chloride, and potassium chloride. The slag is cooled and flaked. A typical analysis of magnesium slag approximates the following:
  50% calcium chloride
  30% sodium chloride
  15% magnesium chloride
  5% potassium chloride Because of its hygroscopic nature this raw material may pick up 1% to 2% by weight moisture in movement and storage but would otherwise be anhydrous in nature and contain no water.

Six thousand five hundred (6500) lbs of by product ingot slag contains 130 lbs of moisture due to the hygroscopic nature of the product in moving and storage:
  (3250 lbs of calcium chloride)
  (1950 lbs of sodium chloride)
  (975 lbs of magnesium chloride)
  (325 lbs of potassium chloride)

It is mixed with three thousand five hundred (3500) lbs of sodium chloride. The above two ingredients are ground to a fine powder 60 to 100 mesh and conveyed to a pan agglomerator.

One thousand (1000) lbs of water as an agglomeration fluid is sprayed onto this mixture in a pan agglomerator.

In this example 5 product the anhydrous calcium chloride can take on a maximum of 650 lbs of water in converting to a dihydrate; and, the magnesium chloride can take on a maximum of 487.5 lbs of water for a total of 1,137.5 lbs of water. And it is still a stable product after so doing. In example 5, I have allowed for 120 lbs of moisture during storage plus 1000 lbs of water as an agglomeration fluid for a total of 1,120 lbs. In example 5 we prepared a stable product without drying.

From the above examples it can be seen that the invention accomplishes at least all of its stated objectives that the essential feature is forming the mixture of at least partially anhydrous halide salts which are ground into a powder and then contacted with the pan agglomerating fluid forming water of the hydration and stabilization, such that particles are dry without drying.

These agglomerated products have been used to deice and found equally as effective as the products of previous U.S. Pat. No. 5,211,869. Therefore it can be seen that the invention accomplishes at least all of its stated objectives.

What is claimed is:

1. A method of forming a stable, pan agglomerated deicer composition without having to employ a drying step, said method comprising:

forming a mixture of at least partially anhydrous halide salts of metals selected from the group consisting of alkali metals and alkaline earth metals;

grinding said mixture of halide salts into a fine powder;

pan agglomerating said powder with a pan agglomerating fluid selected from group consisting of water, and water solutions of at least some of said mixture of halide salts to form fully hydrated and stable pan agglomerated salt mixture agglomerated particles, which do not require drying.

2. The process of claim 1 wherein the amount of water in the pan agglomerating fluid is from 5% by weight to 15% by weight.

3. The process of claim 2 wherein the amount of water in the pan agglomerating fluid is from 8% by weight to 12% by weight.

4. The process of claim 2 wherein the pan agglomerating fluid contains ice melter enhancers.

5. The process of claim 4 wherein the ice melter enhancers are selected from the group consisting of surface active agents, corrosion inhibitors and stabilizers.

6. The process of claim 5 wherein the ice melter enhancer is a surface active agent.

7. The process of claim 6 wherein the surface active agent is selected from the group consisting of nonionic, cationic and anionic surface active agents.

8. The process of claim 7 wherein the surface active agent is an nonionic surface active agent selected from the group consisting of ethoxylated alkylphenols, ethoxylated non-alkylphenols, and ethylene oxide.

9. The process of claim 7 wherein the surface active agent is a cationic/quaternary surfactant.

10. The process of claim 7 wherein the agent is an anionic surface active agent consisting of sulfates and the sulfates of oils and fatty acids.

11. The process of claim 5 wherein the ice melter enhancer is a corrosion inhibitor.

12. The process of claim 11 wherein the corrosion inhibitor is a sugar.

13. The process of claim 5 wherein the ice melter enhancer is a stabilizer.

14. The process of claim 5 wherein the amount of ice melter enhancer is from 0.5% by weight to 1.0% by weight.

15. A pan agglomerated ice melter, comprising:

pan agglomerated particles of at least partially anhydrous halide salts of metals selected from the group consisting of alkali and alkaline earth metals which have been ground to a fine powder and then agglomerated with a pan agglomerating fluid.

16. The pan agglomerated ice melter of claim 15 which includes an ice melter enhancer selected from the group consisting of surface active agents, corrosion inhibiters and stabilizers.

17. The pan agglomerated ice melter of claim 16 wherein the amount of ice melter enhancer is from 0.5% by weight to 1.0% by weight.

\* \* \* \* \*